May 5, 1959 — R. L. HARRELL — 2,884,736
MINNOW BOX
Filed Oct. 5, 1956
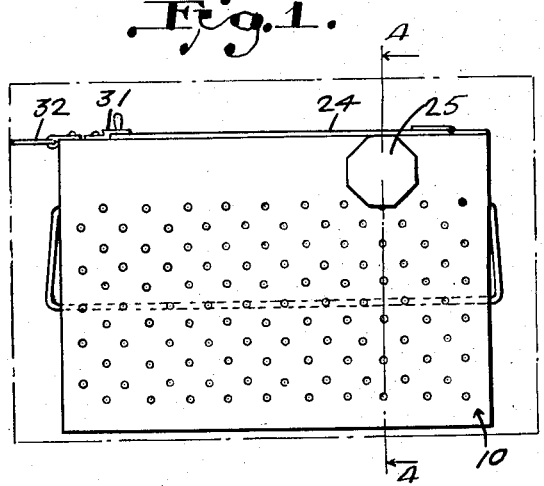
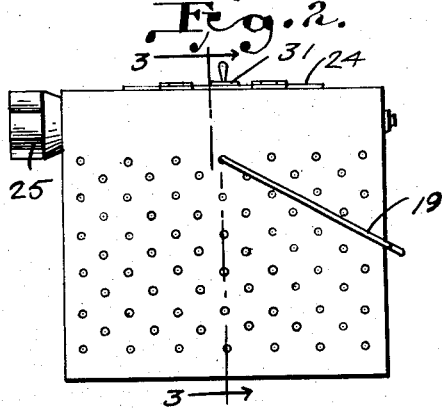
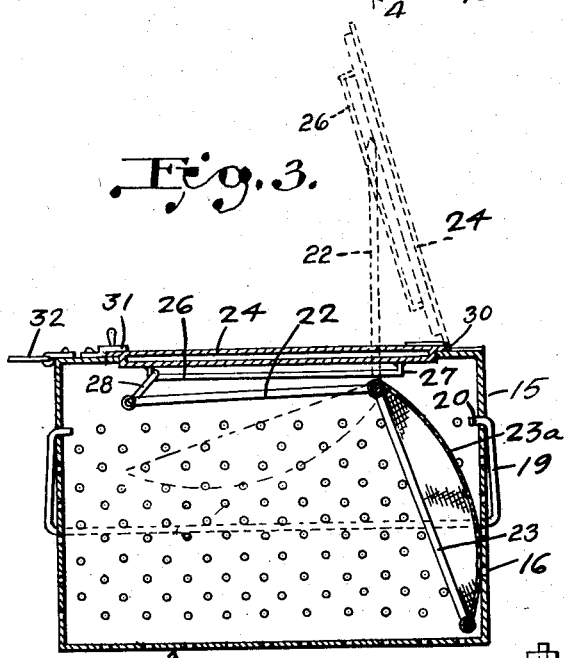
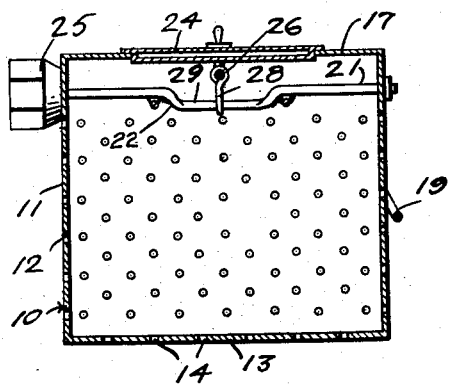
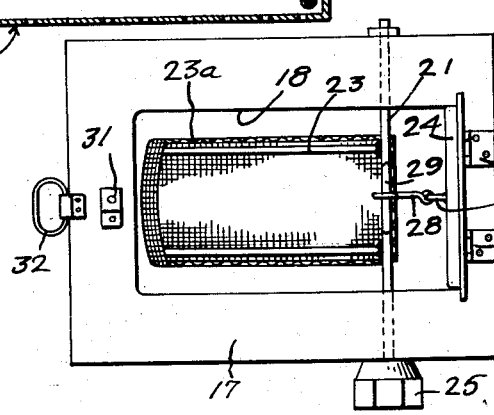
Rufus L. Harrell
INVENTOR
BY
ATTORNEYS.

United States Patent Office 2,884,736
Patented May 5, 1959

2,884,736

MINNOW BOX

Rufus L. Harrell, Austin, Tex.

Application October 5, 1956, Serial No. 614,285

1 Claim. (Cl. 43—56)

This invention relates to a minnow trap.

An object of this invention is to provide in a minnow trap, a net with means connected between the net and the lid or closure for raising the net at the time the lid is raised and thereby picking up minnows in the net.

Another object of this invention is to provide a minnow trap which includes a perforate housing with a hinged lid, a net with means swingably supporting the net in the housing, and a sliding connection between the net supporting means and the lid whereby when the lid is closed the net will be disposed in a substantially vertical inoperative position, and when the lid is opened the net will be swung upwardly to a position where minnows caught in the net may be removed for bait.

With the foregoing and other objects in view which will appear as the description proceeds, the invention consists of certain novel details of construction and combinations of parts, hereinafter more fully described and pointed out in the claim, it being understood that changes may be made in the construction and arrangement of parts without departing from the spirit of the invention as claimed.

Referring to the drawing:

Figure 1 is a detail side elevation of a floating minnow trap constructed according to an embodiment of this invention.

Fig. 2 is an end elevation of the trap.

Fig. 3 is a sectional view taken on line 3—3 of Fig. 2.

Fig. 4 is a sectional view taken on line 4—4 of Fig. 1.

Fig. 5 is a plan view of the device with the lid in open position.

Referring to the drawing, the numeral 10 designates generally a housing or box which is provided with side walls 11 having openings 12. The housing or box 10 also includes a bottom wall 13 having openings or perforations 14 and also includes end walls 15 having openings or perforations 16. The box or housing 10 also includes a top wall 17 having a relatively large opening 18. U-shaped bail 19 is pivotally secured to the end walls 15 being provided with inwardly projecting lugs 20 which extend through the end walls 15.

A shaft 21 is rotatably disposed between the side walls 11 adjacent the upper portions thereof and the shaft 21 has formed integral therewith a U-shaped portion 22. A substantially U-shaped net frame 23 is secured to the shaft 21 and extends obtusely with respect to the lever 22. A flexible net 23ª is carried by the frame 23 and in the closed position of the closure 24 the net 23ª will be disposed in substantially depending position closely adjacent one of the end walls 15. One end of the shaft 21 has a knob 25 secured thereto whereby the shaft 21 may be rotated and the net 23ª with the frame 23 raised upwardly to a substantially horizontal position, as shown in the dotted line position in Fig. 3. The closure 24 has a guide bar 26 secured thereto in spaced parallel relation, the bar 26 being provided with right-angled offset ends 27 which are welded or otherwise fixed to the lower side of the lid or closure 24. A looped link or slide member 28 loosely engages the bight 29 of U-shaped portion 22 and slidably engages guide 26. In this manner when shaft 21 is turned to swing net 23ª upwardly to a position permitting the collecting of minnows therein and the removal of the minnows from net 23ª, the lid 24 will simultaneously be raised upwardly to substantially the dotted line position shown in Fig. 3. One end of the lid 24 is hinged as at 30 to the top wall 17 and when the lid 24 is in its closed position the lid may be locked by means of a latch 31 which is pivotally carried by the top wall 17. A ring 32 is secured to one end of the top wall 17 so as to permit the anchoring of the housing 10 to a boat or the like at the time the lid 24 is in a closed and locked position.

In the use and operation of the trap the minnows are placed within the housing 10 at the time the housing 10 is immersed in water. When it is desired to remove minnows from the trap or housing 10 knob 25 is turned clockwise so as to raise net 23ª from a depending inoperative position to a substantially horizontal operative position. As net 23ª swings upwardly minnows disposed forwardly of the net will be caught therein and may be readily removed at the time the lid 24 is raised simultaneously with the upward swinging of net 23ª.

What is claimed is:

A minnow box comprising a housing formed of perforate side, end, bottom and top walls, said top wall having a large opening therethrough, an upwardly opening hinged closure carried by said top wall, a shaft having a central U-shaped portion extending transversely across said housing adjacent the upper portions of said side walls, a U-shaped net supporting frame secured to said shaft at an obtuse angle relative to said U-shaped portion, a cup-shaped net fixed to and depending from said frame, a rotatable knob on one end of said shaft, a guide bar fixed to the lower side of said closure, and a double link slide rockably surrounding the bight of said U-shaped portion of said lever and slidably engaging around said guide bar, upward swinging of said net by rotation of said knob and said shaft effecting simultaneous raising of said closure.

References Cited in the file of this patent

UNITED STATES PATENTS

| | | |
|---|---|---|
| 372,124 | Craig | Oct. 25, 1887 |
| 986,229 | Seeger | May 7, 1911 |
| 2,657,496 | Spotswood | Nov. 3, 1953 |
| 2,732,966 | Schroeder et al. | Jan. 31, 1956 |